United States Patent
Park

(10) Patent No.: US 11,541,712 B2
(45) Date of Patent: Jan. 3, 2023

(54) SUSPENSION CONTROL SYSTEM, SUSPENSION CONTROL METHOD AND SUSPENSION CONTROL APPARATUS

(71) Applicant: HL KLEMOVE CORP., Incheon (KR)

(72) Inventor: Minki Park, Gyeonggi-do (KR)

(73) Assignee: HL KLEMO VE CORP., Incheon (KR)

( * ) Notice: Subject to any disclaimer, the term of this patent is extended or adjusted under 35 U.S.C. 154(b) by 335 days.

(21) Appl. No.: 16/724,155

(22) Filed: Dec. 20, 2019

(65) Prior Publication Data

US 2020/0215867 A1 Jul. 9, 2020

(30) Foreign Application Priority Data

Jan. 4, 2019 (KR) .................. 10-2019-0001269

(51) Int. Cl.
*B60G 17/0165* (2006.01)
*B60R 11/04* (2006.01)
*B60G 17/019* (2006.01)

(52) U.S. Cl.
CPC ....... *B60G 17/0165* (2013.01); *B60G 17/019* (2013.01); *B60R 11/04* (2013.01);
(Continued)

(58) Field of Classification Search
CPC .............. B60G 17/0165; B60G 17/019; B60G 2400/82; B60G 2401/14; B60G 2800/914;
(Continued)

(56) References Cited

U.S. PATENT DOCUMENTS 9,358,854 B1* 6/2016 Sandbulte ............ B60G 17/017
2004/0094912 A1* 5/2004 Niwa .................. B60G 17/0165
280/5.518

(Continued)

FOREIGN PATENT DOCUMENTS

KR 10-2012-0051553 5/2012
KR 10-2013-0003901 1/2013
(Continued)

OTHER PUBLICATIONS

Office Action dated Jan. 20, 2020 for Korean Application No. 10-2019-0001269 and its English translation by Google Translate.

*Primary Examiner* — Babar Sarwar
(74) *Attorney, Agent, or Firm* — Ladas & Parry, LLP

(57) ABSTRACT

Disclosed are a system, a method, and an apparatus for controlling a suspension using image data captured by an image sensor. The suspension control apparatus includes at least one image sensor mounted to an own vehicle to capture image data of the surrounding environment of the own vehicle, and a controller configured to control the own vehicle based on the image data captured by the at least one image sensor, wherein the controller receives the image data from the at least one image sensor, extracts suspension control reference information including at least one of road environment information, own vehicle surrounding object information, and own vehicle state information based on the image data and/or an in-vehicle sensor of the own vehicle, and generates a control signal for controlling the height of a suspension according to the suspension control reference information.

18 Claims, 6 Drawing Sheets

(52) U.S. Cl.
CPC ...... *B60G 2400/82* (2013.01); *B60G 2401/14* (2013.01); *B60G 2800/914* (2013.01)

(58) Field of Classification Search
CPC ............ B60G 17/018; B60G 17/01908; B60G 17/01933; B60G 17/01941; B60G 17/0195; B60G 2400/821; B60G 2400/822; B60G 2400/8222; B60G 2400/823; B60G 2400/824; B60G 2401/144; B60G 2401/174; B60G 2401/16; B60G 2401/142; B60G 2600/18; B60G 2800/915; B60G 2800/916; B60G 2800/92; B60R 11/04
See application file for complete search history.

(56) References Cited

U.S. PATENT DOCUMENTS

| | | | | |
|---|---|---|---|---|
| 2014/0222287 | A1* | 8/2014 | Popham | B60G 17/0165 701/37 |
| 2015/0145220 | A1* | 5/2015 | Yellambalase | B60G 17/0165 280/5.514 |
| 2015/0304406 | A1* | 10/2015 | Penilla | B60L 1/06 709/203 |
| 2017/0066439 | A1* | 3/2017 | Lee | B60W 30/095 |
| 2017/0129298 | A1* | 5/2017 | Lu | B60G 17/015 |
| 2017/0349023 | A1* | 12/2017 | Mori | B60G 17/0195 |
| 2018/0079272 | A1* | 3/2018 | Aikin | B60G 17/0195 |
| 2018/0089907 | A1* | 3/2018 | Maruoka | G06V 20/58 |
| 2019/0359025 | A1* | 11/2019 | Wager | B60G 21/073 |
| 2020/0016951 | A1* | 1/2020 | Letizio | B60G 99/008 |
| 2020/0094645 | A1* | 3/2020 | Edren | B60G 17/0525 |

FOREIGN PATENT DOCUMENTS

| | | |
|---|---|---|
| KR | 10-2013-0019942 | 2/2013 |
| KR | 10-2014-0045684 | 4/2014 |
| KR | 10-2018-0071776 | 6/2018 |

* cited by examiner

[FIG. 1]
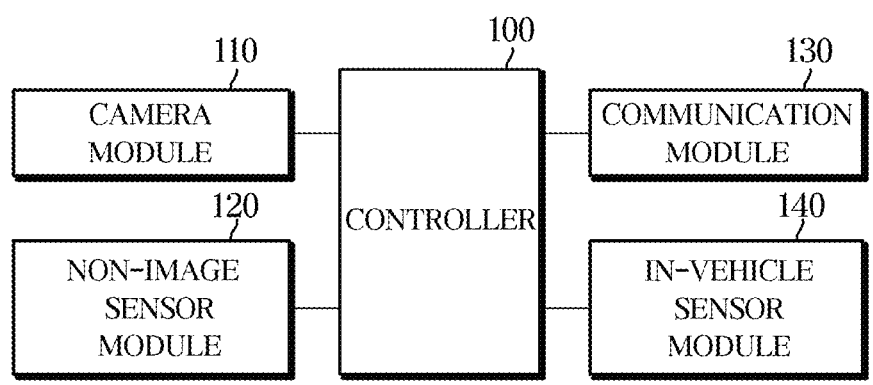

[FIG. 2]
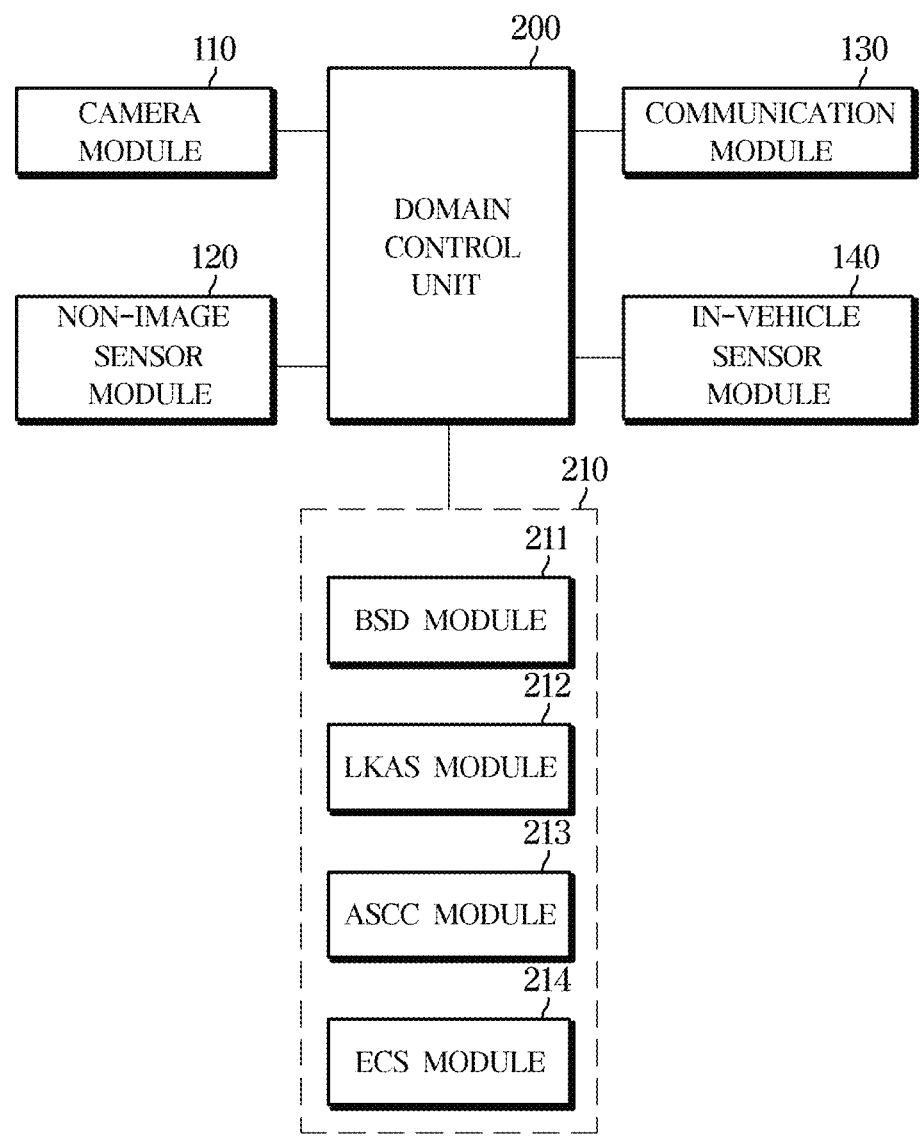

[FIG. 3]
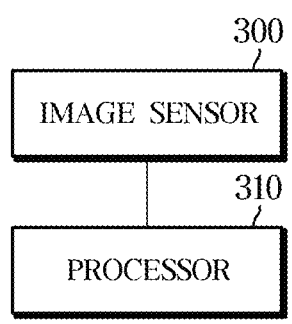
[FIG. 4]
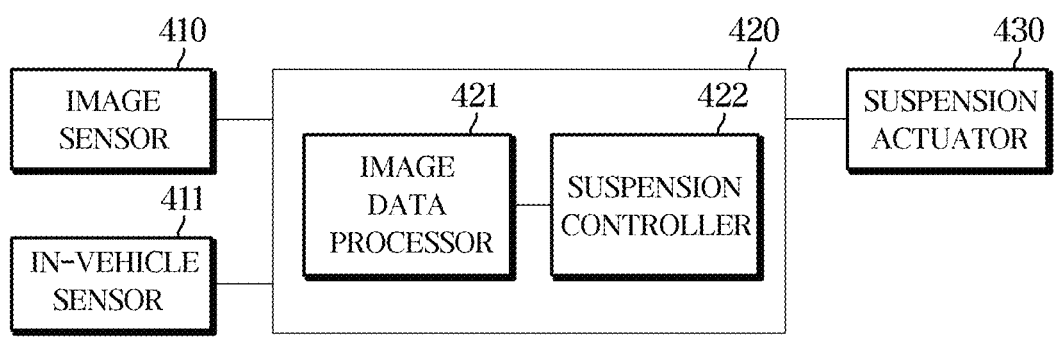

[FIG. 5]
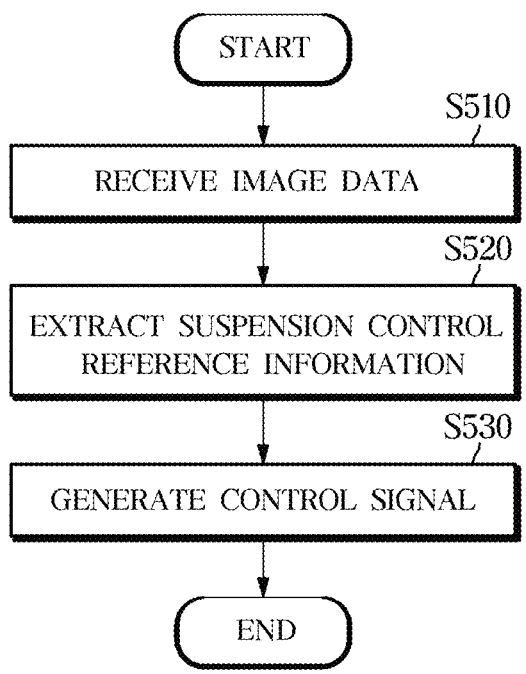

[FIG. 6]
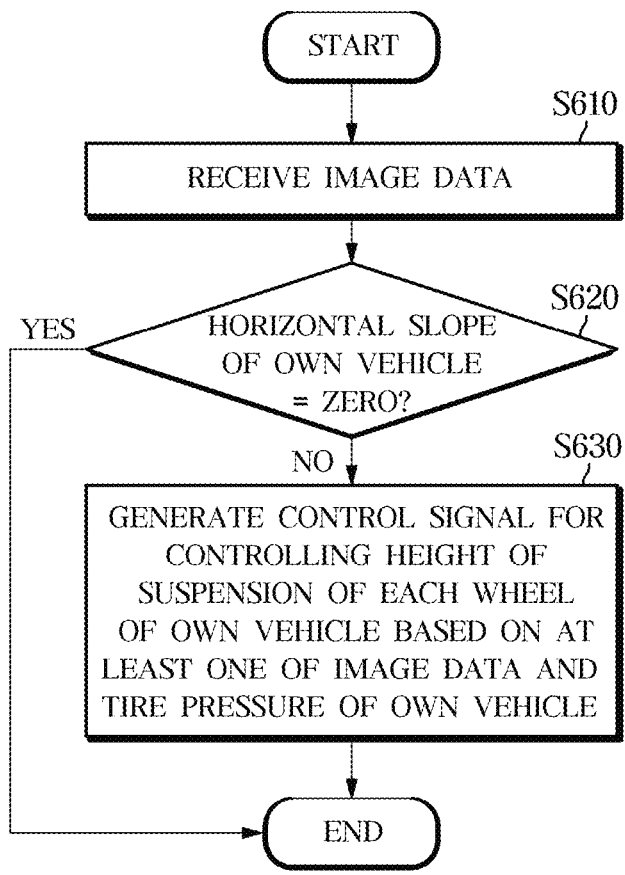
[FIG. 7]
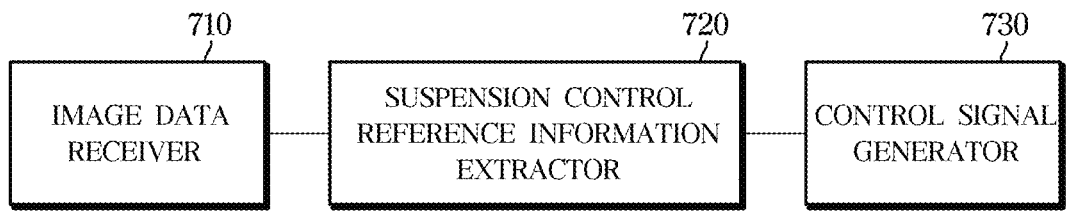

[FIG. 8]
800
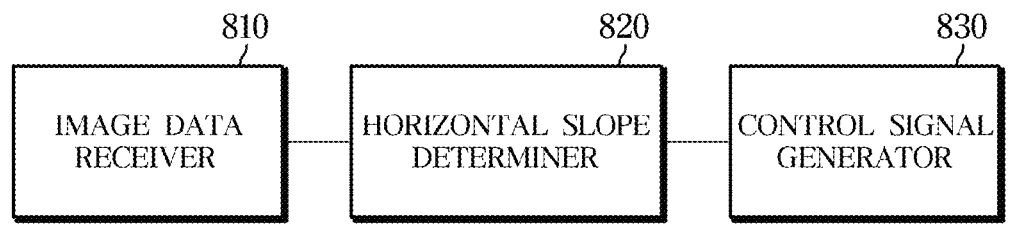

SUSPENSION CONTROL SYSTEM, SUSPENSION CONTROL METHOD AND SUSPENSION CONTROL APPARATUS

CROSS-REFERENCE TO RELATED APPLICATION(S)

This application is based on and claims priority under 35 U.S.C. § 119 to Korean Patent Application No. 10-2019-0001269, filed on Jan. 4, 2019, in the Korean Intellectual Property Office, the present disclosure of which is incorporated by reference herein in its entirety.

BACKGROUND

1. Technical Field

The present disclosure relates to a suspension control system, a suspension control method, and a suspension control apparatus, and more particularly, to a system, a method, and an apparatus for controlling a suspension using image data captured by an image sensor.

2. Description of the Related Art

When a vehicle travels, wheels move up and down linearly in addition to the rotational movement. An impact is transmitted to the vehicle by the rotational movement and the linear movement. The vehicle is provided with a suspension function to prevent such a shock from being transmitted directly to the occupant of the vehicle. A suspension ensures that a tire is firmly grounded on a road surface for a comfortable ride and acts as a cushion between a vehicle body and the wheel so that the wheel is sufficiently grounded during sudden brakes or during sharp turns.

One type of the suspension is an air suspension. The air suspension includes a spring and a compressor and may control the height of a vehicle (vehicle height). Specifically, in the air suspension, a driver of the vehicle changes the height of the vehicle by adjusting the pressure of the spring using a human machine interface (HMI), for example, a switch. However, in a conventional air suspension, it is difficult to freely change the height of the vehicle because the vehicle height adjustment step and the height adjustment are limited, and it is impossible to adjust the vehicle height in real time according to the driving environment of the vehicle.

SUMMARY

It is an aspect of the present disclosure to provide a suspension control system, a suspension control method and a suspension control apparatus capable of extracting suspension control reference information from image data captured by an image sensor and vehicle interior sensor information and controlling the height of suspension according to the extracted suspension control reference information.

Additional aspects of the present disclosure will be set forth in part in the description which follows and, in part, will be obvious from the description, or may be learned by practice of the present disclosure.

In accordance with an aspect of the present disclosure, a suspension control system includes at least one image sensor mounted to an own vehicle to capture image data of the surrounding environment of the own vehicle, and a controller configured to control the own vehicle based on the image data captured by the at least one image sensor, wherein the controller receives the image data from the at least one image sensor, extracts suspension control reference information including at least one of road environment information, own vehicle surrounding object information, and own vehicle state information based on the image data and/or an in-vehicle sensor of the own vehicle, and generates a control signal for controlling the height of a suspension according to the suspension control reference information.

In accordance with another aspect of the present disclosure, a suspension control method includes receiving image data from at least one image sensor mounted to an own vehicle to capture the image data of the surrounding environment of the own vehicle, extracting suspension control reference information including at least one of road environment information, own vehicle surrounding object information, and own vehicle state information based on the image data and/or an in-vehicle sensor of the own vehicle, and generating a control signal for controlling the height of a suspension according to the suspension control reference information.

In accordance with another aspect of the present disclosure, a suspension control apparatus includes an image data receiver configured to receive image data from at least one image sensor mounted to an own vehicle to capture the image data of the surrounding environment of the own vehicle, a suspension control reference information extractor configured to extract suspension control reference information including at least one of road environment information, own vehicle surrounding object information, and own vehicle state information based on the image data and/or an in-vehicle sensor of the own vehicle, and a control signal generator configured to generate a control signal for controlling the height of a suspension according to the suspension control reference information.

BRIEF DESCRIPTION OF THE DRAWINGS

These and/or other aspects of the present disclosure will become apparent and more readily appreciated from the following description of the embodiments, taken in conjunction with the accompanying drawings of which:

FIG. 1 is a block diagram of a vehicle according to an embodiment;

FIG. 2 is a block diagram of a vehicle according to another embodiment;

FIG. 3 is a block diagram for explaining a camera module configured in a vehicle;

FIG. 4 is a view illustrating a configuration of a suspension control system according to an embodiment of the present disclosure;

FIG. 5 is a flowchart illustrating a suspension control method according to an embodiment of the present disclosure;

FIG. 6 is a flowchart illustrating a suspension control method according to another embodiment of the present disclosure;

FIG. 7 is a view illustrating a configuration of a suspension control apparatus according to an embodiment of the present disclosure; and FIG. 8 is a view illustrating a configuration of a suspension control apparatus according to another embodiment of the present disclosure.

DETAILED DESCRIPTION

Hereinafter, embodiments of the present disclosure will be described in detail with reference to the exemplary drawings. It will be understood that, although the terms first, second, A, B, (a), (b) etc. may be used herein to describe various components, these components should not be limited by these terms. These terms are only used to distinguish one component from another. For example, without departing from the scope of the present disclosure, the first component may be referred to as a second component, and similarly, the second component may also be referred to as a first component. Throughout this specification, when a portion is connected to another portion, this includes the case in which the portion is indirectly connected to the other portion, as well as the case in which the portion is directly connected to the other portion.

The vehicle in the present specification may be a concept including an automobile, a motorcycle, and the like. In addition, the vehicle may be a concept including an internal combustion engine vehicle having an engine as a power source, a hybrid vehicle having an engine and an electric motor as a power source, and an electric vehicle having an electric motor as a power source. In the following description, the vehicle is mainly described as an automobile.

In the following description, the front indicates the forward driving direction of the vehicle, and the rear indicates the backward driving direction of the vehicle. The left side of the vehicle indicates the left side of the forward driving direction of the vehicle, and the right side of the vehicle indicates the right side of the forward driving direction of the vehicle. In addition, the rear side of the vehicle indicates the left or the right side with respect to the backward driving direction of the vehicle.

FIG. 1 is a block diagram of a vehicle according to an embodiment. Referring to FIG. 1, a vehicle may be configured to include a controller 100, a camera module 110, a non-image sensor module 120, a communication module 130, an in-vehicle sensor module 140, and the like.

For example, the camera module 110 may include an image sensor configured to have a field of view of the inside or the outside of the vehicle to capture image data, and a processor configured to process the captured image data. Herein, a camera module includes a CMOS (VGA, HD) camera, a CCD camera, a stereo camera, a 3D Lidar, an infrared camera (NIR, FIR), and the like.

As an example, the image sensor may be disposed in the vehicle to have a field of view of the inside or the outside of the vehicle. At least one image sensor may be mounted to each part of the vehicle to have a field of view of the front, the sides or the rear of the vehicle.

Because image information photographed by the image sensor is composed of image data, the image information may refer to image data captured by the image sensor. Hereinafter in the present disclosure, image information photographed by the image sensor refers to image data captured by the image sensor.

The image data captured in the image sensor may be processed in the processor. The processor may operate to process the image data captured by the image sensor.

The processor may be implemented in hardware using at least one of electrical units capable of processing the image data and performing and other functions such as controllers, micro-controllers, and microprocessors (for example, computers and the like).

The non-image sensor module 120 refers to another sensor module except for the camera module 110 which captures an image. For example, a plurality of the non-image sensor modules 120 may be disposed in the vehicle to have a sensing region for the inside or the outside of the vehicle, thereby capturing sensing data. Examples of the plurality of non-image sensor modules 120 include a radar sensor, a lidar sensor, an ultrasonic sensor, and the like. The non-image sensor module 120 may not be provided or may be provided with one or more.

The communication module 130 functions to perform vehicle-to-vehicle communication, vehicle-to-infrastructure communication, vehicle-to-server communication, in-vehicle communication, and the like. To this end, the communication module 130 may be composed of a transmitting module and a receiving module. For example, the communication module 130 may include a broadcast receiving module, a wireless internet module, a short range communication module, a location information module, an optical communication module, a V2X communication module, and the like.

The broadcast receiving module receives a broadcast signal or broadcast related information from an external broadcast management server through a broadcast channel. The broadcast includes at least one of radio broadcast and TV broadcast. The wireless internet module refers to a module for wireless internet access and may be mounted on the inside or the outside of the vehicle. The short range communication module, which is for short range communication, may support short-range communication using at least one of Bluetooth™ technology, RFID (Radio Frequency Identification) technology, IrDA (Infrared Data Association) technology, UWB (Ultra-Wideband) technology, ZigBee technology, NFC (Near Field Communication) technology, Wi-Fi (Wireless-Fidelity) technology, Wi-Fi Direct technology, and USB (Wireless Universal Serial Bus) technology.

The location information module is a module for obtaining location information of a vehicle, and a representative example thereof is a GPS (Global Positioning System) module. For example, when a vehicle utilizes a GPS module, the vehicle may acquire the position of the vehicle using a signal transmitted from a GPS satellite. According to an embodiment, the location information module is not a component included in the communication module 130, but may be a component included in the in-vehicle sensor module 140.

The optical communication module may include an optical transmitter and an optical receiver. The light transmitter and the light receiver may convert a light signal into an electrical signal to transmit and receive information.

The V2X communication module is a module for performing wireless communication with a server or another vehicle, an infrastructure device, or the like. The V2X communication module in the present embodiment means a device or a technology that allows a vehicle to exchange information with other vehicles, mobile devices, roads, and the like through a wired or wireless network. The V2X communication module may be a concept including V2V (vehicle to vehicle), V2I (vehicle to infrastructure), V2N (vehicle to nomadic device), and V2P (vehicle to pedestrian). The V2X communication module is based on dedicated short-range communications (DSRC), and may use the WAVE (Wireless Access in Vehicular Environment) which was recently conducted by the Institute of Electrical and Electronics Engineers (IEEE) or use the IEEE 802.11p communication technology using the 5.9 GHz band, but is limited thereto, and it should be understood that the V2X communication module includes all inter-vehicle communications that will be developed now or in the future.

The in-vehicle sensor module 140 refers to a sensor for sensing vehicle interior information. For example, the in-vehicle sensor module 140 may refer to a torque sensor for sensing a steering torque, a steering angle sensor for sensing a steering angle, a motor position sensor for sensing information on a steering motor, a vehicle speed sensor, a vehicle motion sensor for sensing the movement of a vehicle, a vehicle attitude sensor, a height sensor for sensing a vehicle height, a tire pressure sensor, and the like. In addition, the in-vehicle sensor module 140 may refer to a sensor for sensing various data in the vehicle, and may be configured as one or more sensors.

The controller 100 may obtain data from at least one of the camera module 110, the non-image sensor module 120, the communication module 130, and the in-vehicle sensor module 140 and control various operations of the vehicle based on the obtained data. The controller 100 may also obtain image data from the camera module 110 and process the image data. The controller 100 may also receive sensing data from the non-image sensor module 120 and process the sensing data. In addition, the controller 100 may obtain data from the in-vehicle sensor module 140 or the communication module 130 and process the obtained data. For this processing, the controller 100 may include at least one processor.

In addition, the controller 100 may control the operation of at least one of the camera module 110, the non-image sensor module 120, the communication module 130, and the in-vehicle sensor module 140. The controller 100 may also control the operation of various driver assistance systems provided in the vehicle.

FIG. 2 is a block diagram of a vehicle according to another embodiment. Referring to FIG. 2, the vehicle may be configured to include at least one of the camera module 110, the non-image sensor module 120, the communication module 130, and the in-vehicle sensor module 140. Description thereof has been described with reference to FIG. 1 and thus will be omitted.

The vehicle may also include a domain control unit (DCU) 200. The domain control unit 200 may be configured to process at least one of image data and sensing data by receiving the image data captured from at least one image sensor and receiving the sensing data captured from a plurality of non-image sensors. For this processing, the domain control unit 200 may include at least one processor.

In addition, the domain control unit 200 may transmit and receive data with at least one of the camera module 110, the non-image sensor module 120, the communication module 130, the in-vehicle sensor module 140 and a driver assistance system module unit 210 and process data received therethrough. That is, the domain control unit 200 may be provided in a vehicle and communicate with at least one module mounted in the vehicle. To this end, the domain control unit 200 may further include a suitable data link or communication link such as a vehicle network bus for data transmission or signal communication.

The domain control unit 200 may operate to control one or more of the various driver assistance systems (DAS) used in the vehicle. For example, the domain control unit 200 is may determine a specific situation, condition, event occurrence, performance of a control operation, and the like based on data obtained from at least one of the camera module 110, the non-image sensor module 120, the communication module 130, the in-vehicle sensor module 140 and the driver assistance system module unit 210.

The domain control unit 200 may transmit a signal for controlling the operation of various modules of the driver assistance system module unit 210 provided in the vehicle by using the determined information and the like. For example, the driver assistance system module unit 210 may include a blind spot detection (BSD) system module 211, a lane keep assist system (LKAS) module 212, an adaptive smart cruise control (ASCC) system module 213, an electronic controlled suspension (ECS) module 214, and the like. In addition, the driver assistance system module unit 210 provided in the vehicle may exist in various ways such as a lane departure warning system (LBWS), a lane change assistance system (LCAS), a parking assistance system (PAS), and the like. The terms and names of the driver assistance systems described herein are disclosed by way of example and not limited thereto. In addition, the driver assistance system module unit 210 may include an autonomous driving module for autonomous driving. Alternatively, the domain control unit may control the vehicle to perform autonomous driving through control of the individual system modules included in the driver assistance system module unit 210.

FIG. 3 is a block diagram for explaining a camera module configured in a vehicle.

Referring to FIG. 3, the camera module 110 may include an image sensor 300 and a processor 310. The image sensor 300 may refer to a device for converting light (image information) input through a camera lens into an electrical digital signal. For example, the image sensor 300 may refer to a charge coupled device (CCD) image sensor that directly transmits an electronic signal. The image sensor 300 may also refer to a complementary metal oxide semiconductor (CMOS) image sensor (VGA, HD image sensor) that converts a signal into a voltage form and transmits the converted signal.

As described above, the image sensor 300 may be disposed in the vehicle to have a field of view of the inside or the outside of the vehicle, and the at least one image sensor 300 may be mounted to each part of the vehicle to have a field of view of the front, the sides or the rear of the vehicle.

The image data captured by the image sensor 300 may be generated, for example, in one of raw formats of AVI, MPEG-4, H.264, DivX, and JPEG. The image data captured in the image sensor 300 may be processed in the processor 310.

The processor 310 may operate to process the image data captured by the image sensor 300. For example, the processing of the image data may be processed by a processor included in the camera module. As another example, the image data may be processed by the controller 100 or the domain control unit 200 described above. For example, the processor 310 may process the data read by the image sensor 300 into a high quality image through various operations. As needed, the processor 310 may process image data to perform operations such as target detection, distance measurement, and target classification.

Terms for each component and exemplary description of each component that are described above are for convenience of understanding, and the present disclosure is not limited to the terms and exemplary description. In the following, in order to more clearly describe the embodiments according to the present disclosure, the above terms may be changed and described. The configuration of the vehicle described with reference to FIGS. 1 to 3 is exemplary, and in the following description, the configuration may be changed, added, and omitted in order to more clearly describe the technical idea.

FIG. 4 is a view illustrating a configuration of a suspension control system according to an embodiment of the present disclosure.

Referring to FIG. 4. a suspension control system 400 includes at least one image sensor 410 mounted to an own vehicle to capture image data on the surrounding environment of the own vehicle, an in-vehicle sensor 411 for sensing in-vehicle information, a controller 420 for controlling the own vehicle based on the image data captured by the at least one image sensor 410 and/or the in-vehicle sensing information, and a suspension actuator 430 for controlling the suspension of the own vehicle by a control signal from the controller 420.

The at least one image sensor 410 included in the suspension control system 400 according to the present disclosure is disposed in the vehicle to have a field of view of the inside or the outside of the vehicle and may capture image data for the front, the sides, the rear, or the like of the vehicle. Therefore, the image sensor 410 may be mounted at any position, such as the front, the left front, the right front, the rear, the left rear, the right rear, the side mirrors, or the sides of the vehicle.

The image sensor 410 according to the present disclosure may correspond to the camera module 110 in FIG. 1, the camera module 110 in FIG. 2, or the image sensor 300 in FIG. 3. Thus, the image sensor 410 may be referred to the description of the camera module 110 in FIG. 1, the camera module 110 in FIG. 2, or the image sensor 300 in FIG. 3.

The suspension control system 400 according to the present disclosure may additionally include at least non-image sensor (not shown). The non-image sensor may be disposed in the vehicle to sense the inside or the outside of the vehicle to capture sensing data about the front, the rear, the sides, or the like of the vehicle. Therefore, the non-image sensor may be mounted at any position, such as the front, the left front, the right front, the rear, the left rear, the right rear, the side mirrors, or the sides of the vehicle. In addition, the non-image sensor 410 may correspond to the non-image sensor module 120 in FIGS. 1 and 2. Thus, the non-image sensor may be referred to the description of the non-image sensor module 120 in FIGS. 1 and 2.

The in-vehicle sensor 411 included in the suspension control system 400 according to the present disclosure refers to a sensor for sensing in-vehicle information. For example, the in-vehicle sensor 411 may refer to a vehicle speed sensor, a vehicle motion sensor for sensing the movement of a vehicle, a vehicle attitude sensor, a height sensor for sensing a vehicle height, a tire pressure sensor, and the like. In addition, the in-vehicle sensor 411 may refer to a sensor for sensing various data in the vehicle, and may be configured as one or more sensors.

The controller 420 of the suspension control system 400 according to the present disclosure includes an image data processor 421 for receiving image data from the at least one image sensor 410 to process the image data, and a suspension controller 422 for extracting suspension control reference information including at least one of road environment information, own vehicle surrounding object information, and own vehicle state information based on the image data and generating a control signal for controlling the height of the suspension according to the suspension control reference information. The controller 420 may receive the outside sensing data of the own vehicle and the inside sensing data of the own vehicle captured by the non-image sensor and the in-vehicle sensor 411, extract the suspension control reference information based on at least one of the image data, the outside sensing data of the own vehicle, and the inside sensing data of the own vehicle, and generate a control signal for controlling the height of the suspension according to the suspension control reference information.

The image data processor 421 of the controller 420 may receive image data from the at least one image sensor 410 and perform preprocessing. Specifically, the image data processor 421 may perform noise reduction on image data, rectification, calibration, color enhancement, color space conversion (CSC), interpolation, image sensor gain control, and the like. Through this processing, the image data processor 421 may acquire a clearer image than the image data received from the image sensor 410.

The suspension controller 422 of the controller 420 extracts the suspension control reference information based on the image data and/or the inside sensor of the own vehicle. The suspension control reference information, which is a parameter for controlling the suspension of the vehicle, includes at least one of road environment information, own vehicle surrounding object information, and own vehicle state information. The suspension controller 422 generates a control signal for controlling the height of the suspension according to the suspension control reference information, and transmits the generated control signal to the suspension actuator 430.

In an embodiment, the road environment information includes at least one of information on the type of the road on which the own vehicle is located, information on the road surface state of the road on which the own vehicle is located, and information on whether a bump exists on the road on which the own vehicle is located.

The type of the road on which the own vehicle is located may be classified according to a road construction material. For example, the type of the road on which the vehicle is located may include an asphalt road, a concrete road, a dirt road, and the like. In addition, the type of the road on which the own vehicle is located may be classified according to the road use of the vehicle. For example, the type of the road on which the vehicle is located may include a highway, a national road, a parking lot road, an underpass road, and the like.

In an embodiment, when the suspension control reference information includes information that the type of the road on which the own vehicle is located corresponds to a highway, a parking lot, or an underpass, the controller 420 may generate a control signal for controlling the suspension actuator 430 to lower the height of the suspension.

The information on the road surface state of the road on which the own vehicle is located may be determined based on the image data captured by the image sensor 410. The controller 420 may determine the road surface state of the road using information on the color, the shape and the like of the road in the image data. For example, when the color of the road is yellow, there are grain-like particles on the road, or the road horizon is not a constant straight line, the controller 420 may determine that the road surface state of the road on which the own vehicle is located is not good.

The information on the road surface state of the road on which the own vehicle is located may also be determined according to information in which the image data captured by the image sensor 410 shakes. The controller 420 may determine a shaking degree of the image data by comparing the image data captured by the image sensor 410 and determine the road surface state according to the shaking degree of the image data. For example, when the shaking degree of the image data is equal to or greater than a predetermined value, the controller 420 may determine that the road surface state is not good.

As an example, the controller 420 may express the state of the road surface as a percentage or a value. The controller 420 may determine the road surface state of the road from the image data as a percentage or a value according to a road surface state table of the road according to previously stored image data.

In an embodiment, when the suspension control reference information includes information on the road surface state of the road on which the own vehicle is located, the controller 420 may generate a control signal for controlling the height of the suspension according to a relationship between a previously stored road surface state of the road and the height of the suspension. The relationship between the road surface state of the road and the height of the suspension may be stored in the controller 420 in a table or map format.

The information on whether a bump exists on the road on which the own vehicle is located may be determined based on the image data captured by the image sensor 410 or the sensing information captured by a non-image sensor (e.g., radar) (not shown). For example, the controller 420 may determine whether a bump exists within a preset distance range in the front of the own vehicle based on the image data.

In an embodiment, when the suspension control reference information includes information that a bump exists on the road on which the own vehicle is located, the controller 420 may generate a control signal for controlling the suspension actuator 430 to increase the height of the suspension.

In an embodiment, the road environment information may be extracted from a combination of two or more of image data from at least one image sensor, navigation information, and road information from an infrastructure server of the road on which the vehicle is located. The controller 420 may further include a communication function, and may receive navigation information through wireless communication or V2X communication or may receive road information from the infrastructure server on the road. When the road environment information is extracted from a combination of at least two of the image data, the navigation information, and the road information from the infrastructure server, the recognition accuracy of the surrounding environment of the own vehicle may be improved.

In an embodiment, the own vehicle surrounding object information includes at least one of information on vehicles existing in the vicinity of the own vehicle and information on whether obstacles exist on the travel route of the own vehicle. The vehicles existing in the vicinity of the own vehicle are vehicles existing in the front, the rear, or the sides of the own vehicle. The obstacles existing on the travel route of the own vehicle include any object on the road on which the own vehicle is traveling or a curb around the path on which the own vehicle is to travel.

In an embodiment, when the suspension control reference information includes information that no preceding vehicle exists in the front of the own vehicle, the controller 420 may generate a control signal for controlling the suspension actuator 430 to lower the height of the suspension.

In an embodiment, when the suspension control reference information includes information that an obstacle exists on the travel route of the own vehicle, the controller 420 may generate a control signal for controlling the suspension actuator 430 to increase the height of the suspension. Specifically, when the controller 420 detects an obstacle in the front of the road or the path on which the vehicle is traveling based on the image data captured by the image sensor 410 or the sensing data captured by the non-image sensor, the controller 420 may generate a control signal for increasing the height of the suspension to avoid the obstacle by increasing the height of the own vehicle and transmit the control signal to the suspension actuator 430.

In an embodiment, when the suspension control reference information includes information that an obstacle exists on the travel route of the own vehicle, the controller 420 may extract the height of the obstacle based on the image data, and when it is determined that the height of the vehicle body according to the maximum height of the suspension is larger than the height of the obstacle, the controller 420 may generate a control signal for controlling the suspension actuator 430 to increase the height of the suspension. When the controller 420 determines that the height of the vehicle body according to the maximum height of the suspension is not larger than the height of the obstacle, the controller 420 may drive an operation for providing a collision alarm or preventing a front collision.

In an embodiment, the own vehicle state information includes at least one of information on whether doors of the own vehicle are open and vehicle speed information of the own vehicle. The doors of the own vehicle include doors located on the sides of the vehicle body for human access, and a door located at the rear of the vehicle body for a space for loading cargo. The information on whether the doors of the own vehicle are open may be sensed by the in-vehicle sensors. The vehicle speed information of the own vehicle may be sensed by the vehicle speed sensor included in the in-vehicle sensors.

In an embodiment, when the suspension control reference information includes information that the door of the own vehicle is open, the controller 420 may generate a control signal for controlling the suspension actuator 430 to lower the height of the suspension. Opening the door of the vehicle means that a person or cargo may enter or exit, and in this case, the height of the vehicle may be lowered so that the person or cargo may easily enter or exit.

In an embodiment, when the suspension control reference information includes information that the door of the own vehicle is open, the controller 420 may further receive image data from the image sensor facing the opened door, and when a motion corresponding to a preset motion is sensed or a shape corresponding to a preset shape is sensed from the image data, the controller 420 may generate a control signal for controlling the suspension actuator 430 to lower the height of the suspension. When the door of the own vehicle is in an open state, the controller 420 may further receive information (e.g., image data or sensing data) on the opened door and its surroundings, and when the preset motion or shape is sensed from the received information, the controller 420 may generate a control signal to adjust the height of the suspension. The preset motion may include a motion for increasing the height of the vehicle or a motion for allowing the vehicle to increase the height of the vehicle. The controller 420 may receive a motion from the driver and set the motion as a preset motion. The preset shape may include a shape in which a person is carrying a load. The controller 420 may store various types of preset shapes, and when a shape in which a part or the whole of one of a plurality of preset shapes coincides with information on the opened door is acquired, the controller 420 may determine that a shape corresponding to the preset shape is sensed and generate a control signal for controlling the height of the suspension.

In an embodiment, when the suspension control reference information includes information that the vehicle speed of the own vehicle is equal to or greater than a threshold value, the controller 420 may generate a control signal for controlling the suspension actuator 430 to lower the height of the suspension.

In an embodiment, when a horizontal slope of the own vehicle is not zero, the controller 420 may generate a control signal for controlling the height of the suspension of each wheel of the own vehicle based on at least one of values of the pitch, roll, and yaw axes of the image data, a straight line extracted from a portion recognized as the horizon or ground extracted from image data, and a tire pressure of the own vehicle. The horizontal slope of the own vehicle may be sensed by a horizontal sensor, or the horizontal slope may be measured using information on a horizontal line extracted from the image data captured by the image sensor 410 or a straight line recognized as the horizon or ground. Alternatively, the horizontal slope of the own vehicle may be calculated using the values of the pitch, roll, and yaw axes indicated by the image data. The controller 420 may generate a control signal for controlling the height of the suspension of each wheel of the own vehicle in a direction of decreasing the horizontal slope of the own vehicle based on at least one of the values of the pitch, roll, and yaw axes of the image data, a straight line extracted from a portion recognized as the horizon or ground extracted from image data, and the tire pressure of the own vehicle.

In an embodiment, when an absolute value of the horizontal slope of the own vehicle is larger than a preset slope, the controller 420 may generate a control signal for controlling the height of the suspension to the maximum height in a direction of decreasing the absolute value of the horizontal slope of the own vehicle. For example, when the absolute value of the horizontal slope of the own vehicle is larger than the preset slope, the controller 420 may generate a control signal for controlling to increase the height of the suspension of a wheel positioned at a relatively low side or closer to the ground with respect to the horizontal of the own vehicle to the maximum.

The controller 420 may perform a stable control without controlling beyond a limit range of a spring of the suspension by controlling to increase the height of the suspension of a wheel positioned at a relatively low side or closer to the ground with respect to the horizontal of the own vehicle only to the maximum. Selectively, the controller 420 may generate a control signal for controlling to lower the height of the suspension of a wheel positioned at a relatively high side or further away from the ground with respect to the horizontal of the own vehicle. Therefore, the absolute value of the horizontal slope of the own vehicle decreases, so that the vehicle body may be adjusted to be closer to the horizontal.

The controller 420 according to the present disclosure may communicate with an external device using CAN communication according to a predetermined protocol. In addition, the controller 420 may perform a human machine interface (HMI) function such as a switch and an indicator.

The suspension actuator 430 of the suspension control system 400 according to the present disclosure controls the suspension of the own vehicle based on a control signal from the controller 420. The suspension actuator 430 may include an air suspension. Hereinafter a case in which the suspension actuator 430 is the air suspension will be described as an example. However, the suspension actuator 430 according to the present disclosure is not limited to the case of the air suspension.

The suspension actuator 430 includes a spring provided on each wheel of the vehicle, a compressor for providing compressed air to the spring, and a height sensor. The suspension actuator 430 calculates a difference between a target height and the current height based on a control signal from the controller 420 or a signal of the height sensor and regulates the compressed air to reach the target height. As an example, when the current height is lower than the target height, the compressed air is provided to the spring so that the height may be increased, and in this case, the compressed air may be provided through the compressor.

According to the suspension control system of the present disclosure, the suspension control reference information is extracted from the image data captured by the image sensor and the in-vehicle sensor information, and the height of the suspension is controlled according to the extracted suspension control reference information. Therefore, a smooth vehicle height control may be implemented through continuous adjustment of the vehicle height instead of discrete adjustment divided by step, and a vehicle height adjustment may be intelligently performed in response to the surrounding environment of the vehicle in real time.

FIG. 5 is a flowchart illustrating a suspension control method according to an embodiment of the present disclosure.

Referring to FIG. 5, a suspension control method according to the present disclosure includes an image data receiving process (S510) of receiving image data from the at least one image sensor mounted on the own vehicle to capture image data of the surrounding environment of the own vehicle, a suspension control reference information extraction process (S520) of extracting the suspension control reference information including at least one of the road environment information, the own vehicle surrounding object information, and the own vehicle state information based on the image data and/or the inside sensor of the own vehicle, and a control signal generation process (S530) of generating a control signal for controlling the height of the suspension according to the suspension control reference information.

The controller receives the image data from the at least one image sensor mounted on the own vehicle to capture the image data of the surrounding environment of the own vehicle (S510). In an embodiment, the controller may receive the image data, the outside sensing data of the own vehicle and the inside sensing data of the own vehicle that are captured by the image sensor, the non-image sensor and the in-vehicle sensor, extract the suspension control reference information based on at least one of the image data, the outside sensing data of the own vehicle, and the inside sensing data of the own vehicle, and generate a control signal for controlling the height of the suspension according to the suspension control reference information.

The controller extracts the suspension control reference information based on the image data and/or the inside sensor of the own vehicle (S520). The suspension control reference information, which is a parameter for controlling the suspension of the vehicle, includes at least one of the road environment information, the own vehicle surrounding object information, and the own vehicle state information. The controller generates a control signal for controlling the height of the suspension according to the suspension control reference information (S530), and transmits the generated control signal to the suspension actuator.

In an embodiment, the road environment information includes at least one of information on the type of the road on which the own vehicle is located, information on the road surface state of the road on which the own vehicle is located, and information on whether a bump exists on the road on which the own vehicle is located.

The type of the road on which the own vehicle is located may be classified according to a road construction material. For example, the type of the road on which the vehicle is located may include an asphalt road, a concrete road, a dirt road, and the like. In addition, the type of the road on which the own vehicle is located may be classified according to the road use of the vehicle. For example, the type of the road on which the vehicle is located may include a highway, a national road, a parking lot road, an underpass road, and the like.

In an embodiment, when the suspension control reference information includes information that the type of the road on which the own vehicle is located corresponds to a highway, a parking lot, or an underpass, the controller may generate a control signal for controlling the suspension actuator to lower the height of the suspension.

The information on the road surface state of the road on which the own vehicle is located may be determined based on the image data captured by the image sensor. The controller may determine the road surface state of the road using information on the color, the shape and the like of the road in the image data.

The information on the road surface state of the road on which the own vehicle is located may also be determined according to information in which the image data captured by the image sensor shakes. The controller may determine a shaking degree of the image data by comparing the image data captured by the image sensor and determine the road surface state according to the shaking degree of the image data.

As an example, the controller may express the state of the road surface as a percentage or a value. The controller may determine the road surface state of the road from the image data as a percentage or a value according to the road surface state table of the road according to the previously stored image data.

In an embodiment, when the suspension control reference information includes information on the road surface state of the road on which the own vehicle is located, the controller may generate a control signal for controlling the height of the suspension according to a relationship between the previously stored road surface state of the road and the height of the suspension. The relationship between the road surface state of the road and the height of the suspension may be stored in the controller in a table or map format.

The information on whether a bump exists on the road on which the own vehicle is located may be determined based on the image data captured by the image sensor or the sensing information captured by the non-image sensor (e.g., radar) (not shown). For example, the controller may determine whether a bump exists within the preset distance range in the front of the own vehicle based on the image data.

In an embodiment, when the suspension control reference information includes information that a bump exists on the road on which the own vehicle is located, the controller may generate a control signal for controlling the suspension actuator to increase the height of the suspension.

In an embodiment, the road environment information may be extracted from a combination of two or more of image data from at least one image sensor, navigation information, and road information from an infrastructure server of the road on which the vehicle is located. The controller may further include a communication function, and may receive navigation information through wireless communication or V2X communication or may receive road information from the infrastructure server of the road. When the road environment information is extracted from a combination of at least two of the image data, the navigation information, and the road information from the infrastructure server, the recognition accuracy of the surrounding environment of the own vehicle may be improved.

In an embodiment, the own vehicle surrounding object information includes at least one of information on vehicles existing in the vicinity of the own vehicle and information on whether obstacles exist on the travel route of the own vehicle. The vehicles existing in the vicinity of the own vehicle are vehicles existing in the front, the rear, or the sides of the own vehicle. The obstacles existing on the travel route of the own vehicle include any object on the road on which the own vehicle is traveling or a curb around the path on which the own vehicle is to travel.

In an embodiment, when the suspension control reference information includes information that no preceding vehicle exists in the front of the own vehicle, the controller may generate a control signal for controlling the suspension actuator to lower the height of the suspension.

In an embodiment, when the suspension control reference information includes information that an obstacle exists on the travel route of the own vehicle, the controller may generate a control signal for controlling the suspension actuator to increase the height of the suspension. Specifically, when the controller detects an obstacle in the front of the road or the path on which the vehicle is traveling based on the image data captured by the image sensor or the sensing data captured by the non-image sensor, the controller may generate a control signal for increasing the height of the suspension to avoid the obstacle by increasing the height of the own vehicle and transmit the control signal to the suspension actuator.

In an embodiment, when the suspension control reference information includes information that an obstacle exists on the travel route of the own vehicle, the controller may extract the height of the obstacle based on the image data, and when it is determined that the height of the vehicle body according to the maximum height of the suspension is larger than the height of the obstacle, the controller may generate a control signal for controlling the suspension actuator to increase the height of the suspension. When the controller determines that the height of the vehicle body according to the maximum height of the suspension is not larger than the height of the obstacle, the controller may drive an operation for providing a collision alarm or preventing a front collision.

In an embodiment, the own vehicle state information includes at least one of information on whether the doors of the own vehicle are open and vehicle speed information of the own vehicle. The doors of the own vehicle include doors located on the sides of the vehicle body for human access, and a door located at the rear of the vehicle body for a space for loading cargo. The information on whether the doors of the own vehicle are open may be sensed by the in-vehicle sensors. The vehicle speed information of the own vehicle may be sensed by the vehicle speed sensor included in the in-vehicle sensors.

In an embodiment, when the suspension control reference information includes information that the door of the own vehicle is open, the controller may generate a control signal for controlling the suspension actuator to lower the height of the suspension. Opening the door of the vehicle means that a person or cargo may enter or exit, and in this case, the height of the vehicle may be lowered so that the person or cargo may easily enter or exit.

In an embodiment, when the suspension control reference information includes information that the door of the own vehicle is open, the controller may further receive image data from the image sensor facing the opened door, and when a motion corresponding to the preset motion is sensed or a shape corresponding to the preset shape is sensed from the image data, the controller may generate a control signal for controlling the suspension actuator to lower the height of the suspension. When the door of the own vehicle is in an open state, the controller may further receive information (e.g., image data or sensing data) on the opened door and its surroundings, and when the preset motion or shape is sensed from the received information, the controller may generate a control signal to adjust the height of the suspension. The preset motion may include a motion for increasing the height of the vehicle or a motion for allowing the vehicle to increase the height of the vehicle. The controller may receive a motion from the driver and set the motion as a preset motion. The preset shape may include a shape in which a person is carrying a load. The controller may store various types of preset shapes, and when a shape in which a part or the whole of one of a plurality of preset shapes coincides with information on the opened door is acquired, the controller may determine that a shape corresponding to the preset shape is sensed and generate a control signal for controlling the height of the suspension.

In an embodiment, when the suspension control reference information includes information that the vehicle speed of the own vehicle is equal to or greater than the threshold value, the controller may generate a control signal for controlling the suspension actuator to lower the height of the suspension.

According to the suspension control method of the present disclosure, the suspension control reference information is extracted from the image data captured by the image sensor and the in-vehicle sensor information, and the height of the suspension is controlled according to the extracted suspension control reference information. Therefore, a smooth vehicle height control may be implemented through continuous adjustment of the vehicle height instead of discrete adjustment divided by step, and a vehicle height adjustment may be intelligently performed in response to the surrounding environment of the vehicle in real time.

FIG. 6 is a flowchart illustrating a suspension control method according to another embodiment of the present disclosure.

Referring to FIG. 6, according to a suspension control method of another embodiment of the present disclosure, the controller receives the image data from the at least one image sensor mounted on the own vehicle to capture the image data of the surrounding environment of the own vehicle (S610), confirms the horizontal slope of the own vehicle, and determines whether the horizontal slope is zero (S620). When it is determined that the horizontal slope of the own vehicle is zero, the controller recognizes that the vehicle is level and ends the suspension control. However, when it is determined that the horizontal slope of the own vehicle is not zero, the controller recognizes that the own vehicle is not level, and generates a control signal for controlling the height of the suspension of each wheel of the own vehicle based on at least one of the image data and a tire pressure of the own vehicle (S630).

In an embodiment, when the horizontal slope of the own vehicle is not zero, the controller may generate a control signal for controlling the height of the suspension of each wheel of the own vehicle based on at least one of values of the pitch, roll, and yaw axes of the image data, a straight line extracted from a portion recognized as the horizon or ground extracted from image data, and the tire pressure of the own vehicle. The horizontal slope of the own vehicle may be sensed by the horizontal sensor, or the horizontal slope may be measured using information on a horizontal line extracted from the image data captured by the image sensor or a straight line recognized as the horizon or ground. Alternatively, the horizontal slope of the own vehicle may be calculated using the values of the pitch, roll, and yaw axes indicated by the image data. The controller may generate a control signal for controlling the height of the suspension of each wheel of the own vehicle in a direction of decreasing the horizontal slope of the own vehicle based on at least one of the values of the pitch, roll, and yaw axes of the image data, a straight line extracted from a portion recognized as the horizon or ground extracted from image data, and the tire pressure of the own vehicle.

In an embodiment, when an absolute value of the horizontal slope of the own vehicle is larger than the preset slope, the controller may generate a control signal for controlling the height of the suspension to the maximum height in a direction of decreasing the absolute value of the horizontal slope of the own vehicle. For example, when the absolute value of the horizontal slope of the own vehicle is larger than the preset slope, the controller may generate a control signal for controlling to increase the height of the suspension of a wheel positioned at a relatively low side or closer to the ground with respect to the horizontal of the own vehicle to the maximum. The controller 420 may perform a stable control without controlling beyond the limit range of the spring of the suspension by controlling to increase the height of the suspension of a wheel positioned at a relatively low side or closer to the ground with respect to the horizontal of the own vehicle only to the maximum. Selectively, the controller may generate a control signal for controlling to lower the height of the suspension of a wheel positioned at a relatively high side or further away from the ground with respect to the horizontal of the own vehicle. Therefore, the absolute value of the horizontal slope of the own vehicle decreases, so that the vehicle body may be adjusted to be closer to the horizontal.

FIG. 7 is a view illustrating a configuration of a suspension control apparatus according to an embodiment of the present disclosure.

Referring to FIG. 7, a suspension control apparatus 700 according to the present disclosure includes an image data receiver 710 for receiving image data from at least one image sensor mounted on the own vehicle to capture the image data of the surrounding environment of the own vehicle, a suspension control reference information extractor 720 for extracting suspension control reference information including at least one of road environment information, own vehicle surrounding object information, and own vehicle state information based on the image data and/or an inside sensor of the own vehicle, and a control signal generator 730 for generating a control signal for controlling the height of a suspension according to the suspension control reference information.

The image data receiver 710 receives the image data from the at least one image sensor mounted on the own vehicle to capture the image data of the surrounding environment of the own vehicle. In an embodiment, the image data receiver 710 may receive the image data, the outside sensing data of the own vehicle and the inside sensing data of the own vehicle that are captured by the image sensor, the non-image sensor and the in-vehicle sensor, and the suspension control reference information extractor 720 may extract the suspension control reference information based on at least one of the image data, the outside sensing data of the own vehicle, and the inside sensing data of the own vehicle.

The suspension control reference information extractor 720 extracts the suspension control reference information based on the image data and/or the inside sensor of the own vehicle. The suspension control reference information, which is a parameter for controlling the suspension of the vehicle, includes at least one of the road environment information, the own vehicle surrounding object information, and the own vehicle state information. The control signal generator 730 generates a control signal for controlling the height of the suspension according to the suspension control reference information and transmits the generated control signal to a suspension actuator.

In an embodiment, the road environment information includes at least one of information on the type of the road on which the own vehicle is located, information on the road surface state of the road on which the own vehicle is located, and information on whether a bump exists on the road on which the own vehicle is located.

The type of the road on which the own vehicle is located may be classified according to a road construction material. In addition, the type of the road on which the own vehicle is located may be classified according to the road use of the vehicle. The information on the road surface state of the road on which the own vehicle is located may be determined based on the image data captured by the image sensor. The information on the road surface state of the road on which the own vehicle is located may also be determined according to information in which the image data captured by the image sensor shakes. As an example, the suspension control reference information extractor 720 may determine the road surface state of the road from the image data as a percentage or a value according to a road surface state table of the road according to previously stored image data. The information on whether a bump exists on the road on which the own vehicle is located may be determined based on the image data captured by the image sensor or the sensing information captured by a non-image sensor (e.g., radar). For example, the suspension control reference information extractor 720 may determine whether a bump exists within a preset distance range in the front of the own vehicle based on the image data.

In an embodiment, the road environment information may be extracted from a combination of two or more of image data from the at least one image sensor, navigation information, and road information from an infrastructure server of the road on which the vehicle is located. The suspension control apparatus 700 may further include a communication function, and may receive navigation information through wireless communication or V2X communication or may receive road information from the infrastructure server on the road. When the road environment information is extracted from a combination of at least two of the image data, the navigation information, and the road information from the infrastructure server, the recognition accuracy of the surrounding environment of the own vehicle may be improved.

In an embodiment, when the suspension control reference information includes information on the road surface state of the road on which the own vehicle is located, the control signal generator 730 may generate a control signal for controlling the height of the suspension according to a relationship between a previously stored road surface state of the road and the height of the suspension. The relationship between the road surface state of the road and the height of the suspension may be stored in the suspension control apparatus 700 in a table or map format.

In an embodiment, when the suspension control reference information includes information that the type of the road on which the own vehicle is located corresponds to a highway, a parking lot, or an underpass, the control signal generator 730 may generate a control signal for controlling the suspension actuator to lower the height of the suspension.

In an embodiment, the own vehicle surrounding object information includes at least one of information on vehicles existing in the vicinity of the own vehicle and information on whether obstacles exist on the travel route of the own vehicle. The vehicles existing in the vicinity of the own vehicle are vehicles existing in the front, the rear, or the sides of the own vehicle. The obstacles existing on the travel route of the own vehicle include any object on the road on which the own vehicle is traveling or a curb around the path on which the own vehicle is to travel.

In an embodiment, when the suspension control reference information includes information that no preceding vehicle exists in the front of the own vehicle, the control signal generator 730 may generate a control signal for controlling the suspension actuator to lower the height of the suspension.

In an embodiment, when the suspension control reference information includes information that a bump exists on the road on which the own vehicle is located or that an obstacle exists on the travel route of the own vehicle, the control signal generator 730 may generate a control signal for controlling the suspension actuator to increase the height of the suspension.

In an embodiment, when the suspension control reference information includes information that an obstacle exists on the travel route of the own vehicle, the control signal generator 730 may extract the height of the obstacle based on the image data, and when it is determined that the height of the vehicle body according to the maximum height of the suspension is larger than the height of the obstacle, the control signal generator 730 may generate a control signal for controlling the suspension actuator to increase the height of the suspension. When the control signal generator 730 determines that the height of the vehicle body according to the maximum height of the suspension is not larger than the height of the obstacle, the control signal generator 730 may drive an operation for providing a collision alarm or preventing a front collision.

In an embodiment, the own vehicle state information includes at least one of information on whether doors of the own vehicle are open and vehicle speed information of the own vehicle. The doors of the own vehicle include doors located on the sides of the vehicle body for human access, and a door located at the rear of the vehicle body for a space for loading cargo. The information on whether the doors of the own vehicle are open may be sensed by the in-vehicle sensors. The vehicle speed information of the own vehicle may be sensed by the vehicle speed sensor included in the in-vehicle sensors.

In an embodiment, when the suspension control reference information includes information that the door of the own vehicle is open, the control signal generator 730 may generate a control signal for controlling the suspension actuator to lower the height of the suspension.

In an embodiment, when the suspension control reference information includes information that the door of the own vehicle is open, the image data receiver 710 may further receive image data from the image sensor facing the opened door, and when a motion corresponding to a preset motion is sensed or a shape corresponding to a preset shape is sensed from the image data, the image data receiver 710 may generate a control signal for controlling the suspension actuator to lower the height of the suspension. When the door of the own vehicle is in an open state, the image data receiver 710 may further receive information (e.g., image data or sensing data) on the opened door and its surroundings, and when the preset motion or shape is sensed from the received information, the control signal generator 730 may generate a control signal to adjust the height of the suspension. The preset motion may include a motion for increasing the height of the vehicle or a motion for allowing the vehicle to increase the height of the vehicle. The suspension control apparatus 700 may receive a motion from the driver and set the motion as a preset motion. The preset shape may include a shape in which a person is carrying a load. The control signal generator 730 may store various types of preset shapes, and when a shape in which a part or the whole of one of a plurality of preset shapes coincides with information on the opened door is acquired, the control signal generator 730 may determine that a shape corresponding to the preset shape is sensed and may generate a control signal for controlling the height of the suspension.

In an embodiment, when the suspension control reference information includes information that the vehicle speed of the own vehicle is equal to or greater than a threshold value, the control signal generator 730 may generate a control signal for controlling the suspension actuator to lower the height of the suspension.

According to the suspension control apparatus of the present disclosure, the suspension control reference information is extracted from the image data captured by the image sensor and the in-vehicle sensor information, and the height of the suspension is controlled according to the extracted suspension control reference information. Therefore, a smooth vehicle height control may be implemented through continuous adjustment of the vehicle height instead of discrete adjustment divided by step, and a vehicle height adjustment may be intelligently performed in response to the surrounding environment of the vehicle in real time.

FIG. 8 is a view illustrating a configuration of a suspension control apparatus according to another embodiment of the present disclosure.

Referring to FIG. 8, according to a suspension control method of another embodiment of the present disclosure, an image data receiver 810 receives the image data from the at least one image sensor mounted on the own vehicle to capture the image data of the surrounding environment of the own vehicle, and a horizontal slope determiner 820 confirms a horizontal slope of the own vehicle and determines whether the horizontal slope is zero. When it is determined that the horizontal slope of the own vehicle is zero, the horizontal slope determiner 820 recognizes that the vehicle is level and ends the suspension control. However, when it is determined that the horizontal slope of the own vehicle is not zero, the horizontal slope determiner 820 recognizes that the own vehicle is not level, and a control signal generator 830 generates a control signal for controlling the height of the suspension of each wheel of the own vehicle based on at least one of the image data and the tire pressure of the own vehicle.

In an embodiment, when the horizontal slope of the own vehicle is not zero, the control signal generator 830 may generate a control signal for controlling the height of the suspension of each wheel of the own vehicle based on at least one of values of the pitch, roll, and yaw axes of the image data, a straight line extracted from a portion recognized as the horizon or ground extracted from image data, and the tire pressure of the own vehicle. The horizontal slope of the own vehicle may be sensed by the horizontal sensor, or the horizontal slope may be measured using information on a horizontal line extracted from the image data captured by the image sensor or a straight line recognized as the horizon or ground. Alternatively, the horizontal slope of the own vehicle may be calculated using the values of the pitch, roll, and yaw axes indicated by the image data. The control signal generator 830 may generate a control signal for controlling the height of the suspension of each wheel of the own vehicle in a direction of decreasing the horizontal slope of the own vehicle based on at least one of the values of the pitch, roll, and yaw axes of the image data, a straight line extracted from a portion recognized as the horizon or ground extracted from image data, and the tire pressure of the own vehicle.

In an embodiment, when an absolute value of the horizontal slope of the own vehicle is larger than a preset slope, the control signal generator 830 may generate a control signal for controlling the height of the suspension to the maximum height in a direction of decreasing the absolute value of the horizontal slope of the own vehicle. For example, when the absolute value of the horizontal slope of the own vehicle is larger than the preset slope, the control signal generator 830 may generate a control signal for controlling to increase the height of the suspension of a wheel positioned at a relatively low side or closer to the ground with respect to the horizontal of the own vehicle to the maximum. The control signal generator 830 may perform a stable control without controlling beyond the limit range of the spring of the suspension by controlling to increase the height of the suspension of a wheel positioned at a relatively low side or closer to the ground with respect to the horizontal of the own vehicle only to the maximum. Selectively, the control signal generator 830 may generate a control signal for controlling to lower the height of the suspension of a wheel positioned at a relatively high side or further away from the ground with respect to the horizontal of the own vehicle. Therefore, the absolute value of the horizontal slope of the own vehicle decreases, so that the vehicle body may be adjusted to be closer to the horizontal.

As is apparent from the above, according to the present disclosure, suspension control reference information is extracted from the image data captured by an image sensor and in-vehicle sensor information, and the height of a suspension is controlled according to the extracted suspension control reference information. Therefore, a suspension control system, a method and an apparatus according to the present disclosure can implement a smooth vehicle height control through continuous adjustment of the vehicle height instead of discrete adjustment divided by step and can intelligently perform a vehicle height adjustment in response to the surrounding environment of the vehicle in real time.

The above-described embodiments may be implemented through various means. For example, the present embodiments may be implemented by hardware, firmware, software, or a combination thereof.

In the case of an implementation by the hardware, the present embodiments may be implemented by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, or the like.

In the case of an implementation by the firmware or the software, the present embodiments may be implemented in the form of an apparatus, procedure, or function for performing the functions or operations described above. The software code may be stored in a memory unit and driven by a processor. The memory unit may be located inside or outside the processor, and may exchange data with the processor by various known means.

The terms described above such as "system," "processor," "controller," "component," "module," "interface," "model,"

and "unit" may generally refer to computer-related entity hardware, a combination of hardware and software, or running software. For example, the aforementioned components may be, but are not limited to, a process driven by a processor, a processor, a controller, a control processor, an object, an execution thread, and a program and/or a computer. For example, both an application running on a controller or processor and a controller or processor may be components. One or more components may be within a process and/or an execution thread and a component may be located on one system or deployed on more than one system.

The terms "comprise," "include" and "have" described above mean that the corresponding component may be included unless otherwise stated, and therefore it is to be understood that the terms are not to exclude other components, but may further include other components. All terms, including technical and scientific terms, have the same meanings as commonly understood by one of ordinary skill in the art unless otherwise defined. Terms used generally, such as terms defined in a dictionary, should be interpreted to coincide with the contextual meaning of the related art, and shall not be interpreted in an ideal or excessively formal sense unless explicitly defined in the present disclosure.

The embodiments described in the present specification and the configurations shown in the drawings are only examples of preferred embodiments of the present disclosure, and it will be understood that various modifications may be made thereto at the time of filing of the present application to replace the embodiments of the present specification and the drawings. Accordingly, the disclosed embodiments are not intended to limit the technical spirit of the present disclosure but to describe the scope of the technical spirit of the present disclosure, and the scope of the technical spirit of the present disclosure is not limited by these embodiments. That is, within the scope of the present disclosure, all of the components may be selectively operated in combination with one or more. The protection scope of the present disclosure should be interpreted by the following claims, and all technical ideas within the scope equivalent thereto shall be construed as being included in the scope of the present disclosure.

What is claimed is:

1. A suspension control system comprising:
   at least one image sensor mounted to an own vehicle to capture image data of a surrounding environment of the own vehicle; and
   a controller configured to control the own vehicle based on the image data captured by the at least one image sensor,
   wherein the controller receives the image data from the at least one image sensor, extracts suspension control reference information based on the image data and/or an in-vehicle sensor of the own vehicle, and generates a control signal for controlling the height of a suspension according to the suspension control reference information,
   wherein the suspension control reference information includes at least one of road environment information, own vehicle surrounding object information, and own vehicle state information, and
   wherein the controller is configured to:
   when the suspension control reference information indicates that a door of the own vehicle is open, further receive image data from the image sensor facing the opened door of the own vehicle, and
   when a motion corresponding to a preset motion is sensed from the image data further received from the image sensor facing the opened door of the own vehicle or when a shape corresponding to a preset shape is sensed from the image data further received from the image sensor facing the opened door of the own vehicle, generate a control signal for controlling to lower the height of the suspension.

2. The suspension control system according to claim 1, wherein
   the road environment information includes at least one of information on a type of the road on which the own vehicle is located, information on the road surface state of the road on which the own vehicle is located, and information on whether a bump exists on the road on which the own vehicle is located,
   the own vehicle surrounding object information includes at least one of information on vehicles existing in the vicinity of the own vehicle and information on whether obstacles exist on the travel route of the own vehicle, and
   the own vehicle state information includes at least one of information on whether the door of the own vehicle is open and vehicle speed information of the own vehicle.

3. The suspension control system according to claim 2, wherein
   the road environment information is extracted from a combination of two or more of the image data from the at least one image sensor, navigation information, and road information from an infrastructure server of the road on which the vehicle is located.

4. The suspension control system according to claim 2, wherein
   when the suspension control reference information includes information on the road surface state of the road on which the own vehicle is located, the controller generates a control signal for controlling the height of the suspension according to a relationship between a previously stored road surface state of the road and the height of the suspension.

5. The suspension control system according to claim 2, wherein
   when the suspension control reference information includes information that a bump exists on the road on which the own vehicle is located or that an obstacle exists on a travel route of the own vehicle, the controller generates a control signal for controlling to increase the height of the suspension.

6. The suspension control system according to claim 5, wherein
   when the suspension control reference information includes the information that an obstacle exists on the travel route of the own vehicle, the controller extracts the height of the obstacle based on the image data, and when it is determined that the height of a vehicle body according to a maximum height of the suspension is larger than the height of the obstacle, the controller generates a control signal for controlling to increase the height of the suspension.

7. The suspension control system according to claim 2, wherein
   when the suspension control reference information includes information that the type of the road on which the own vehicle is located corresponds to a highway, a parking lot, or an underpass, information that no preceding vehicle exists in the front of the own vehicle, information that the door of the own vehicle is open, or information that the vehicle speed of the own vehicle is equal to or greater than a threshold value, the controller generates a control signal for controlling to lower the height of the suspension.

8. The suspension control system according to claim 1, wherein
when a horizontal slope of the own vehicle is not zero, the controller generates a control signal for controlling the height of the suspension of each wheel of the own vehicle based on at least one of values of the pitch, roll, and yaw axes of the image data, horizon extracted from image data, and a tire pressure of the own vehicle.

9. The suspension control system according to claim 8, wherein
when an absolute value of the horizontal slope of the own vehicle is larger than a preset slope, the controller generates a control signal for controlling the height of the suspension to a maximum height in a direction of decreasing the absolute value of the horizontal slope of the own vehicle.

10. A suspension control method comprising:
receiving image data from at least one image sensor mounted to an own vehicle to capture the image data of the surrounding environment of the own vehicle;
extracting suspension control reference information based on the image data and/or an in-vehicle sensor of the own vehicle, wherein the control reference information includes at least one of road environment information, own vehicle surrounding object information, and own vehicle state information; and
generating a control signal for controlling the height of a suspension according to the suspension control reference information,
wherein the generating of the control signal comprises:
when the suspension control reference information indicates that a door of the own vehicle is open, further receiving image data from the image sensor facing the opened door of the own vehicle, and
when a motion corresponding to a preset motion is sensed from the image data further received from the image sensor facing the opened door of the own vehicle or when a shape corresponding to a preset shape is sensed from the image data further received from the image sensor facing the opened door of the own vehicle, generating a control signal for controlling to lower the height of the suspension.

11. The suspension control method according to claim 10, wherein
the road environment information includes at least one of information on a type of the road on which the own vehicle is located, information on the road surface state of the road on which the own vehicle is located, and information on whether a bump exists on the road on which the own vehicle is located,
the own vehicle surrounding object information includes at least one of information on vehicles existing in the vicinity of the own vehicle and information on whether obstacles exist on the travel route of the own vehicle, and
the own vehicle state information includes at least one of information on whether the door of the own vehicle is open and vehicle speed information of the own vehicle.

12. The suspension control method according to claim 11, wherein
the road environment information is extracted from a combination of two or more of the image data from the at least one image sensor, navigation information, and road information from an infrastructure server of the road on which the vehicle is located.

13. The suspension control method according to claim 11, wherein
the generating of the control signal includes generating a control signal for controlling the height of the suspension according to a relationship between a previously stored road surface state of the road and the height of the suspension when the suspension control reference information includes information on the road surface state of the road on which the own vehicle is located.

14. The suspension control method according to claim 11, wherein
the generating of the control signal includes generating a control signal for controlling to increase the height of the suspension when the suspension control reference information includes information that a bump exists on the road on which the own vehicle is located or that an obstacle exists on a travel route of the own vehicle.

15. The suspension control method according to claim 14, wherein
the generating of the control signal includes extracting the height of an obstacle based on the image data when the suspension control reference information includes the information that the obstacle exists on the travel route of the own vehicle, and generating a control signal for controlling to increase the height of the suspension when it is determined that the height of a vehicle body according to a maximum height of the suspension is larger than the height of the obstacle.

16. The suspension control method according to claim 11, wherein
the generating of the control signal includes generating a control signal for controlling to lower the height of the suspension when the suspension control reference information includes information that the type of the road on which the own vehicle is located corresponds to a highway, a parking lot, or an underpass, information that no preceding vehicle exists in the front of the own vehicle, information that the door of the own vehicle is open, or information that the vehicle speed of the own vehicle is equal to or greater than a threshold value.

17. The suspension control method according to claim 10, wherein
the generating of the control signal includes generating a control signal for controlling the height of the suspension of each wheel of the own vehicle based on at least one of values of pitch, roll, and yaw axes of the image data, horizon extracted from image data, and a tire pressure of the own vehicle when a horizontal slope of the own vehicle is not zero.

18. The suspension control method according to claim 17, wherein
the generating of the control signal includes generating a control signal for controlling the height of the suspension to a maximum height in a direction of decreasing an absolute value of the horizontal slope of the own vehicle when the absolute value of the horizontal slope of the own vehicle is larger than a preset slope.

* * * * *